Figure 1:
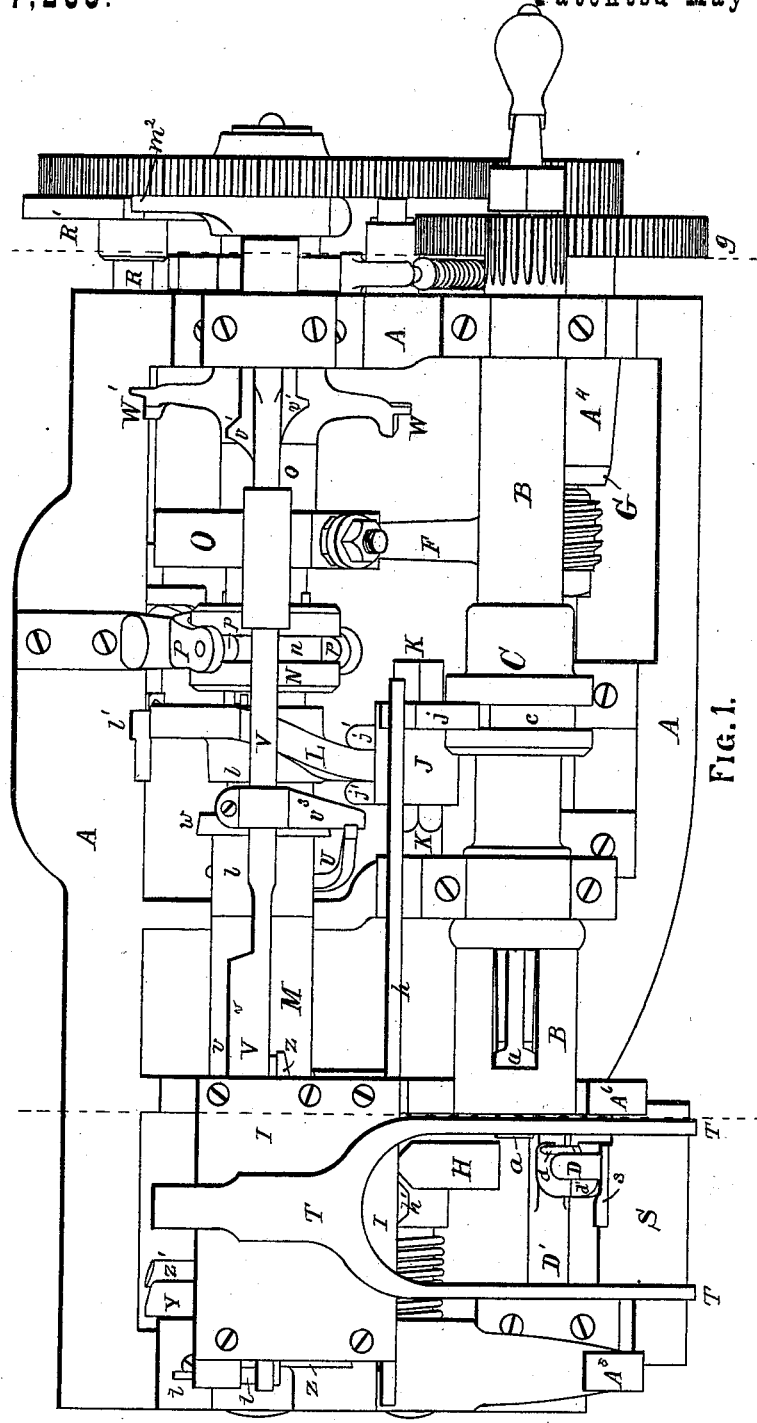

5 Sheets—Sheet 2.

C. D. ROGERS.
MACHINES FOR MAKING WOOD SCREWS.

No. 177,283. Patented May 9, 1876.

WITNESSES.
William W Swan
Saml W Bates

INVENTOR
Charles D. Rogers

5 Sheets—Sheet 4.

C. D. ROGERS.
MACHINES FOR MAKING WOOD SCREWS.

No. 177,283. Patented May 9, 1876.

WITNESSES.
William W Swan
Sandy Bates

INVENTOR.
Charles D Rogers

5 Sheets—Sheet 5.

C. D. ROGERS.
MACHINES FOR MAKING WOOD SCREWS.

No. 177,283. Patented May 9, 1876.

WITNESSES.
William W. Swan
Sam'l W. Bates

INVENTOR.
Charles D. Rogers

UNITED STATES PATENT OFFICE.

CHARLES D. ROGERS, OF PROVIDENCE, RHODE ISLAND.

IMPROVEMENT IN MACHINES FOR MAKING WOOD-SCREWS.

Specification forming part of Letters Patent No. 177,283, dated May 9, 1876; application filed March 27, 1876.

*To all whom it may concern:*

Be it known that I, CHARLES D. ROGERS, of Providence, in the State of Rhode Island, have invented an Improvement in the Manufacture of Wood-Screws, of which the following is a specification:

The invention relates to the manufacture of that class of wood-screws in which the threads are formed by cutting away the metal between them by a tool or chaser having a form corresponding to the space left between the threads.

Heretofore, in the manufacture of wood-screws, when the portion immediately below the neck, which is the part usually termed the "cone of the screw," has been threaded by the same tool which has been used to thread the remainder of the body of the screw, the thread over the cone, instead of being brought to an edge, has been left with a flat top, this flat top gradually decreasing in width until, at the termination of the cone, it came to an edge, which was continued for the rest of the screw.

It is obvious that, in cutting a screw of any given lead by a chaser having its sides inclined to the axis of the screw, the thread can be brought to an edge by cutting to a sufficient depth; and it is also obvious that a screw cannot be cut from a cylindrical wire so as to leave a conical body beneath the thread, and at the same time carry the tool everywhere to a uniform depth. Consequently, with a conical body, the thread has a thick edge, and the shallower the cut the thicker the edge. This has caused the old screw to be imperfect, for the wide or thick part of the thread over the cone does not follow the part brought to an edge over the cylindrical portion of the body as readily as if all the parts were brought to the same edge. The length of this imperfect part of the thread is generally reduced as much as possible by quickly bringing the cut to its maximum depth; but while this does not wholly remove the evil it introduces another which it is desirable to avoid. The screw is most apt to break immediately below the neck, or at the part where in cutting the thread its body is reduced from the full diameter of the blank to the diameter at the bottom of the cut, and the more sudden this reduction the greater is the liability of the screw to be broken.

Attempts have been made to bring the threads to an edge over the cone by introducing a second cutting-tool for that part of the screw; but this method not only involves difficulties in the manufacture which enhance the cost of manufacture, but involves a different inclination of the sides of the thread at that part, which gives to the screw an unsymmetrical appearance, prevents the portion of the thread over the cone from following the lower portion with exactness, and diminishes the holding power.

The object of my invention is to obviate the difficulty above stated; and it consists in making cuts of increased width and diminished depth while going over the cone, in comparison with the width and depth of the cuts along the cylindrical portion of the body of the screw, the increase of width and diminution of depth at any one place having such reference to each other that the thread is everywhere brought to an edge without any difference in the inclination of the sides, while the full outer periphery of the screw is everywhere maintained. This I have accomplished by introducing in an ordinary machine for making wood-screws a contrivance which causes the chaser to increase the width of its cuts over the cone proportionately as the depth is less than what it is over the main part of the screw.

I proceed to describe the machine embodying my invention.

Figure 2:
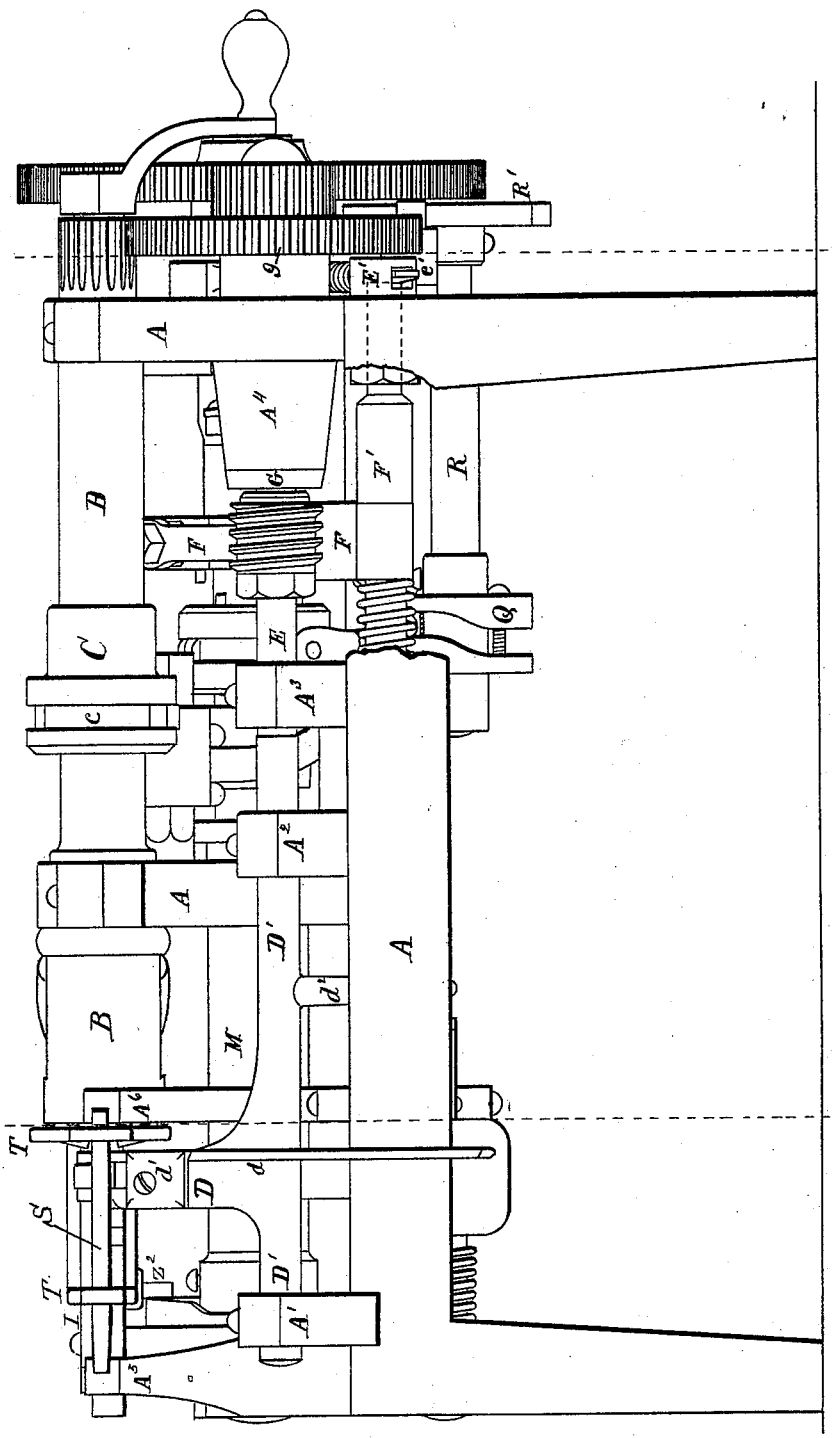
Figure 3:
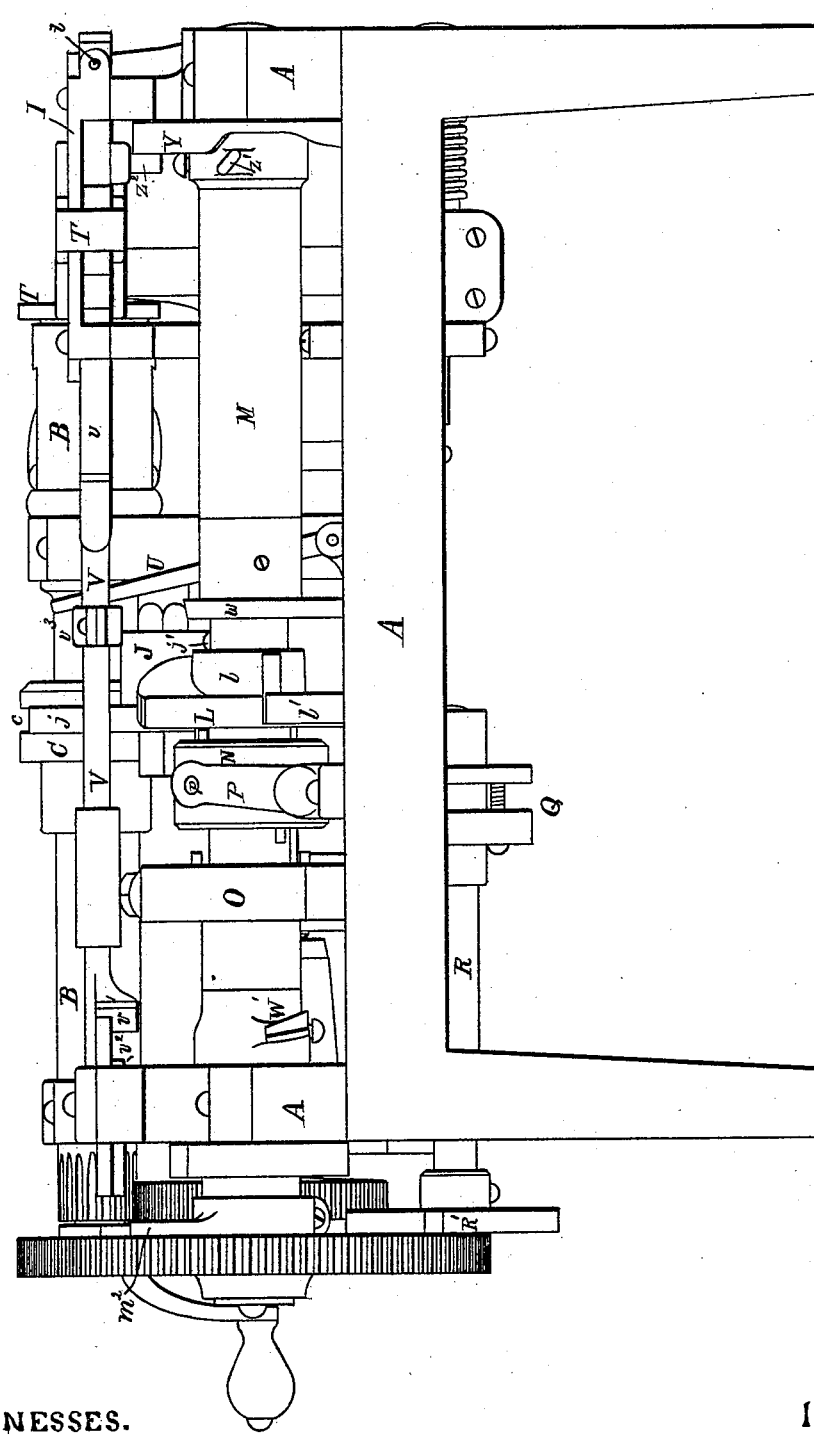
Figure 4:
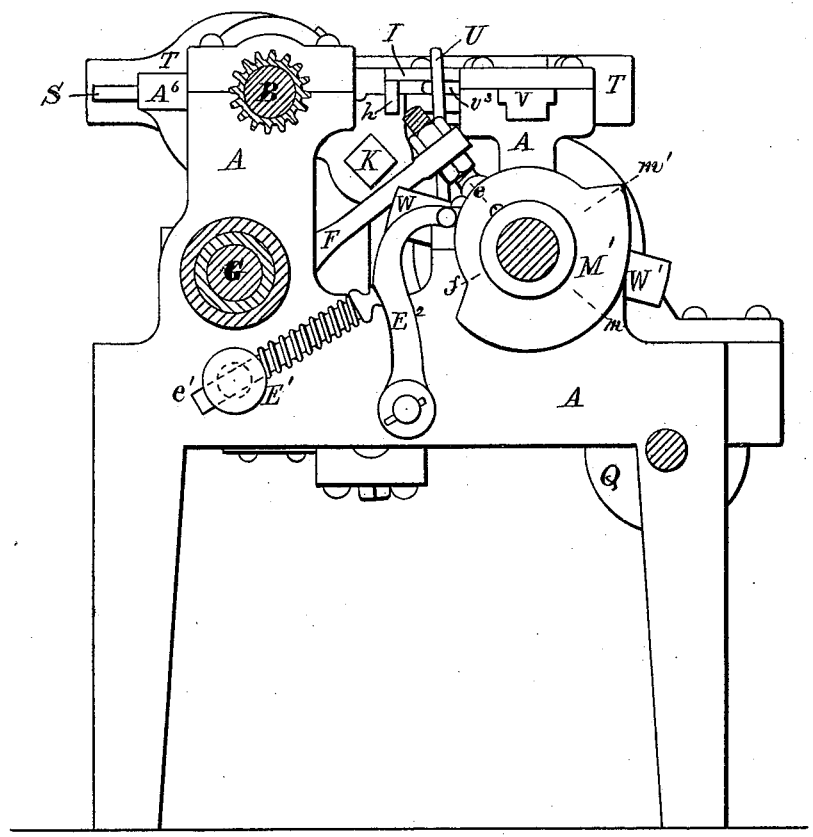
Figure 5:
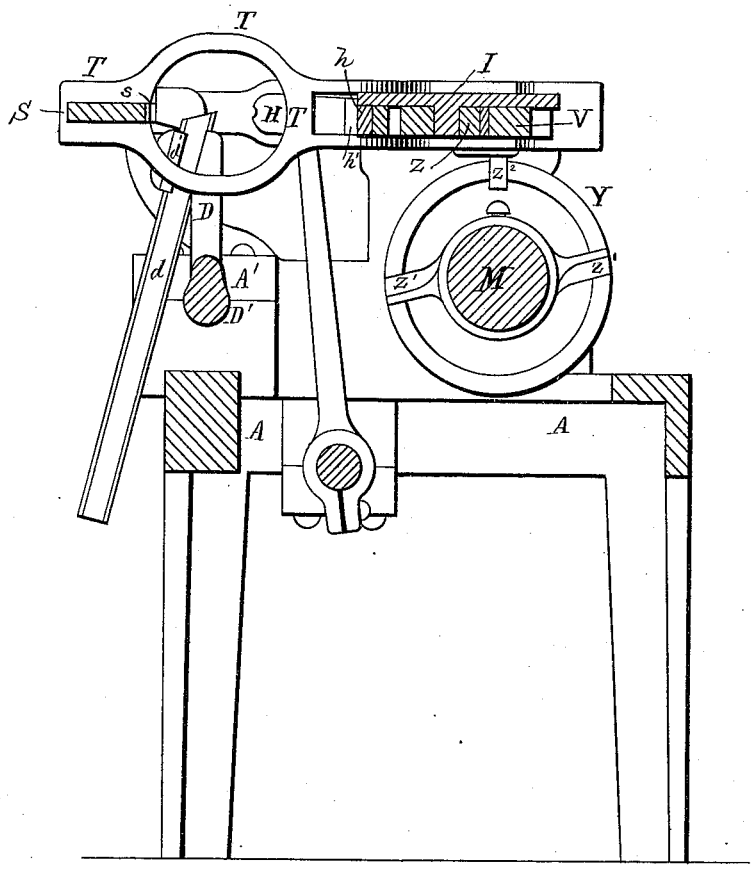
Figure 6:
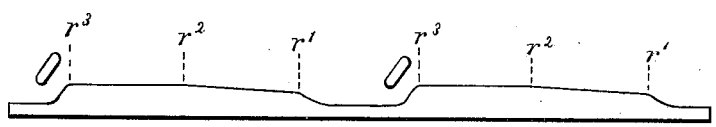

In the drawings, Figure 1 is a plan of said machine. Fig. 2 is a front elevation of the same. Fig. 3 is a rear elevation. Figs. 4 and 5 are sectional elevations taken on the dotted lines in Fig. 1. Fig. 6 is a cam in detail.

A is the frame of said machine. B is the spindle; to it the power is applied, and for the most part it is hollow, carrying within it an ordinary apparatus for holding the screw-blank and presenting it to the chaser. This apparatus consists of a pair of jaws, *a*, which are opened and closed by a rod (not shown) connected with them, and extending back through the spindle, and having a reciprocating motion derived from the sleeve C on the spindle, the sleeve and rod being connected by a pin working in a slot, (not shown,) and the sleeve having a groove, *c*, by means of which it obtains a longitudinal reciprocating motion at proper times, by devices hereinafter described.

D is the tool-post, being an upward rigid projection from a rock-shaft, D', which has bearings at A¹ A² in the frame. The chaser $d$ is held in a slot at the side of the tool-post by a plate, $d^1$, secured to the post by a set screw, as shown. The rock-shaft D' has also a projection, $d^2$, extending downward, attached to which a spring, (not shown,) tends to swing the tool-post outward against a plate, S, which carries a former, $s$, and resists the pressure, as hereinafter shown. The rock-shaft D' has a longitudinal movement in its bearings equal in length to that part of the blank to be threaded, and the spring just referred to also acts to keep the shaft in contact, end to end, with a revolving shaft, E, which has also a reciprocating longitudinal motion, derived from a worm carried upon it, as shown, and operated by a corresponding half-nut or female screw on a rocking lever, F, which is hinged to a shaft, $F^1$, which has one bearing in a projection from and under the main frame, and the other bearing in a sleeve, $E^1$, fixed in the main frame, as shown. Through the outer end of the sleeve $E^1$, and across the end of the shaft $F^1$, plays a wedge, $e'$, forcing the shaft $F^1$ at certain times inward longitudinally, and carrying with it the rocking lever, F, by means of a collar on the shaft coming against the hinge of the lever, as shown. A coiled spring on the other end of the shaft $F^1$, having one end in the main frame, keeps the rocking lever F up against the collar aforesaid, and forces the shaft back longitudinally as the wedge is withdrawn, and this spring is so connected with the rocking lever as to tend to keep the worm of the latter out of gear with the worm of the shaft E. The shaft E not only revolves, but has a longitudinal movement. Near the end, in contact with the tool-post shaft D', as aforesaid, it has a bearing in the main frame at $A^3$. The other bearing is in a recess in the end of a revolving shaft, G, which has its bearing within the main frame, principally in a cone-shaped projection, $A^4$, the shaft E being feathered to the shaft G.

The shaft G, at the outer end, carries a gear, $g$, into which a cog $o$ ı the spindle B takes, as shown. H is a rest or support for the screw-blank. It has a slot (see Fig. 5) across the edge, to embrace that part of the screw-blank which extends in front of the jaws $a$, and with the jaws holds the blank firm against the action of the chaser, the blank revolving in the slot on its own axis. The rest H is movable, and is so arranged in the machine as to be brought up to the blank at the moment the jaws $a$ close to grasp the same. This is accomplished by a slide-rod, $h$, having a longitudinal movement across and under the front edge of a plate, I, the rod being supported by cross-pieces of the main frame, as shown. A projection, $h'$, strikes the rest H, and forces it up to the blank. A slot in the rod $h$ embraces the rear end of a fork, $j$, working in the slot $c$ of the sleeve C. This fork is a rigid projection from a sleeve, J, sliding on a rod, K, attached to a cross-piece of the frame, as shown. The movement of the sleeve J consequently controls both the sleeve C, with the jaws $a$, and the rest H; and the sleeve J is itself controlled by a cam which is on the shaft M, and revolves between two pins, $j' j'$, in sleeve J.

M is a shaft geared to the shaft G, and extending across the machine from end to end at the rear. It carries most of the cams of the machine. O is a cam with two lifts, rigidly attached to a sleeve, $o$, on the shaft M, to operate the worm-lever F. Between the cams L and O is a clutch, N, keyed to the shaft M, and operating the cam L or the cam O, according to its longitudinal position, and this position is determined by means of a slot, $n$, extending across the clutch, as shown, in which play two pins, $p\,p$, being on the end of the fork P, which loosely embraces the clutch, and which has a pivot in the main frame, on which it swings to the right or left. The fork P has also a projecting arm, the lower end of which follows a cam-slotted wheel, Q, on a shaft, R, having bearings under the frame, as shown. At the other end of the shaft R is a star, R', one point of which is struck by an arm, $m^2$, rigidly connected to the shaft M, at each revolution of shaft M. A spring, $l'$, acting against a slot across the rim of cam L, assists in keeping that cam steady when not in gear with the clutch N.

The plate S, before referred to, slides in ways in projections $A^5 A^6$ of the frame, and is rigidly secured to a movable yoke, T, which is slotted, as shown in Fig. 5, to permit the slide-rod $h$ and other parts of the machine to have motions underneath the plate I, in directions at right angles to the motions of the yoke. The movement of the yoke T in one direction brings the sliding plate S nearer to the blank, the chaser $b$ consequently making a deeper cut, and this movement is accomplished by a slide-rod, V, working longitudinally in the main frame, and having at one end a projection, $v$, slightly wedged-shape, to force the yoke T back as the wedge advances through the slot of the yoke. When the yoke T is released from the wedge $v$ of the slide-rod V, the spring, before referred to, on the projection $d^2$ of the tool-post shaft carries back the tool-post, the chaser, the plate S, and former $s$, and with them draws over the yoke T. At the other end of the slide-rod V is a projection, $v^1$, and a set of teeth, $v^2$, one of which is shown in Fig. 3, against which projection and teeth act two peculiarly-shaped arms, W and W', revolving with shaft M, to which they are rigidly connected. The machine is so timed that the slide-rod V is drawn back, so that the wedge $v$ does not act upon the yoke T while the jaws $a$ are dropping the screw and receiving blank. To bring the wedge $v$ into play with the yoke T after the blank has been grasped, projections on arms W and W' successively strike the projection $v^1$ on the rod V, and move the rod forward. After all the teeth have been brought into play, the rod V is drawn back by means of an arm, $v^3$, projecting from the rod, the arm $v^3$ being struck by the upper arm of a bell-crank lever, U, which is attached to the main frame and operated by a cam, $w$, upon the same sleeve which carries the cam L.

Y is a side cam of two lifts, rigidly attached to the shaft M, and $z$ is a wedge having a movement under the plate I at right angles to the motions of the yoke T. This wedge has rigidly connected with it a pin, $z^2$, which follows the cam Y, being forced into contact with it at its depressions by two short arms, $z^1 z^1$, on a sleeve rigidly attached to shaft M. The wedge $z$ acts against the slide-rod V, and through that rod against the yoke T, drawing back the yoke when either lift of the cam Y (the two lifts being alike) acts upon the pin $z^2$, the slide-rod V, for this purpose, being free to move sidewise, and being separated from the wedge $z$ by a gib, as shown in Figs. 1 and 5. The cam Y accordingly controls the movement of the plate S, and through it the movement of the chaser toward the blank. While the pin $z^2$ is in the depressions of the cam Y it has no effect upon the tool-post and chaser, they, in fact, at that time being on the way back from the point to the neck of the blank; but the lifts of the cam, at proper times, acting through the pin $z^2$ and mechanism previously explained, hold the tool up to the blank to make a cut, and each lift of the cam is so shaped as to pull the tool, as it passes from neck to point, gradually inward, to gradually increase the depth of the cut till the full depth is reached, which is maintained for the remainder of the blank. This is independently of the wedge $v$, before referred to.

The operation of the cam Y is illustrated in Fig. 6, where the cam is shown as if removed from the side rim of a wheel, the curve of the wheel being disregarded. As the pin $z^2$ passes from $r^1$ to $r^2$ the tool gradually increases the depth of its cut. The pin reaching $r^2$, from that point to $r^3$ the tool makes a cut of uniform depth.

While the cam Y has the above-described effect upon the bottom cuts of the tool, the cam M′, before referred to, performs a similar duty with reference to the side cuts. This cam M′ is a cam of two lifts on shaft M, to operate the wedge $e'$, before referred to. This it does by means of a rocking lever, $F^2$, which is pivoted to the main frame, as shown in Fig. 4, and follows the cam by force of a spring coiled on the shaft on the end of which is formed the wedge $e'$. But the two lifts of the cam M, as shown in Fig. 4, are unequal, and the wedge $e'$ is, therefore, pushed farther into or drawn back in the slot in the end of the sleeve E, before referred to, accordingly as the end of the rocking lever $E^2$ is in contact with the greater or the lesser lift; and it follows, from the effect of the wedge $e'$ upon the shaft F and mechanism previously described, that when the rocking lever $E^2$ is in contact with the greater lift of the cam M, one side of the chaser is brought into action against the blank, and when the rocking lever is in contact with the lesser lift the other side of the chaser is brought into action against the blank, the chaser thus alternately cutting on one side and the other.

The cam M′ is further divided, there being a decrease in radius from $m^1$ to $m$ of the greater lift, and an increase in the radius of the lesser lift from $f$ to $e$, while the remainders of both lifts are respectively of uniform radius. Accordingly, when the rock-lever $E^2$ is in contact with the cam M′ at $m^1$, the chaser is cutting on the upper side of the thread, and presses with its greatest force or makes its greatest cut toward the point; and this sidewise pressure gradually diminishes until the lever reaches $m$, when the sidewise pressure remains uniform for the rest of the cut. The next time the chaser goes over the blank at the beginning of the cut the rock-lever $E^2$ is in contact with the cam M′ at $f$, and the chaser is cutting on the lower side of the thread, and presses, with its greatest force, toward the neck, and the sidewise pressure gradually diminishes until the lever reaches $e$, whence it remains uniform for the rest of the cut. The cams Y and M′ are timed in combination, so that when the chaser is cutting to the least depth inward toward the axis of the blank it is making its greatest sidewise cut toward the point or toward the neck, as the case may be, and so that where the inward cut is of uniform depth the sidewise cuts are neither increased nor diminished.

The chaser which I have used has a fetch or inclination toward the point of the screw. This gives to the screw the strongest form of point when the entire screw is cut with a single tool; but this feature forms no part of my invention, which has reference only to cutting the thread over the cone and cylindrical portion of the body of the screw, where the full outer periphery of the thread is maintained.

I claim—

In combination with an ordinary screw-threading machine, the mechanism described for accelerating, retarding, and limiting the sidewise cuts of the chaser over the cone and cylindrical body of the screw proportionately to the depth of the cut of the chaser toward the axis of the screw, so as to bring the threads to an edge of a uniform angle over those parts without changing the outer periphery of the screw.

CHARLES D. ROGERS.

Witnesses:
WILLIAM W. SWAN,
CHAS. H. SWAN.